United States Patent
Luo et al.

(10) Patent No.: US 12,304,084 B2
(45) Date of Patent: May 20, 2025

(54) GAIT PLANNING METHOD, ROBOT AND COMPUTER-READABLE STORAGE MEDIUM

(71) Applicant: UBTECH ROBOTICS CORP LTD, Shenzhen (CN)

(72) Inventors: Qiuyue Luo, Shenzhen (CN); Yizhang Liu, Shenzhen (CN); Ligang Ge, Shenzhen (CN); Chunyu Chen, Shenzhen (CN); Jiangchen Zhou, Shenzhen (CN); Meng Yan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 232 days.

(21) Appl. No.: 18/091,292

(22) Filed: Dec. 29, 2022

(65) Prior Publication Data

US 2023/0278212 A1    Sep. 7, 2023

(30) Foreign Application Priority Data

Mar. 2, 2022   (CN) .......................... 202210204305.9

(51) Int. Cl.
*B25J 9/16*    (2006.01)
*G05B 13/04*   (2006.01)

(52) U.S. Cl.
CPC .......... *B25J 9/1664* (2013.01); *B25J 9/1602* (2013.01); *B25J 9/163* (2013.01); *B25J 9/1653* (2013.01); *G05B 13/04* (2013.01)

(58) Field of Classification Search
None
See application file for complete search history.

(56) References Cited

U.S. PATENT DOCUMENTS

| | | | | |
|---|---|---|---|---|
| 7,715,945 B2 * | 5/2010 | Takenaka | ............. | B62D 57/032 700/250 |
| 10,031,524 B2 * | 7/2018 | Su | ......................... | B62D 57/032 |

(Continued)

FOREIGN PATENT DOCUMENTS

| | | | | |
|---|---|---|---|---|
| CN | 111230868 A | * | 6/2020 | ............ B25J 9/1633 |
| CN | 110315543 B | * | 2/2021 | ............ B25J 9/1633 |

(Continued)

OTHER PUBLICATIONS

A novel velocity estimation method for robotic joints based on inverse hyperbolic sine tracing differential algorithm (Year: 2017).*

(Continued)

*Primary Examiner* — Truc M Do
*Assistant Examiner* — Tyler Roger Robarge

(57) ABSTRACT

A gait planning method for a robot includes: constructing a first phase variable of a gait planning of the robot, wherein the first phase variable is a function of two position components of a torso of the robot on a horizontal plane; constructing a second phase variable based on the first phase variable, wherein the second phase variable is a function of the first phase variable, and a slope of the second phase variable is smaller than a slope of the first phase variable when a foot of a swing leg of the robot starts to touch a support surface; and performing the gait planning on the foot of the swing leg using the second phase variable to obtain a planned trajectory of the foot of the swing leg.

20 Claims, 9 Drawing Sheets

(56) References Cited

U.S. PATENT DOCUMENTS

| | | | | |
|---|---|---|---|---|
| 2018/0004208 A1* | 1/2018 | Su | ............................ | G05D 1/021 |
| 2021/0107150 A1* | 4/2021 | Whitman | .............. | G05B 13/042 |
| 2022/0184807 A1* | 6/2022 | Bai | ........................ | B25J 9/1664 |
| 2024/0051121 A1* | 2/2024 | Xie | ........................ | B25J 9/1602 |

FOREIGN PATENT DOCUMENTS

| | | | | | |
|---|---|---|---|---|---|
| CN | 113253724 | A | * | 8/2021 | ............ B25J 9/1664 |
| CN | 113485403 | A | * | 10/2021 | ........... G05D 1/0891 |
| CN | 113467484 | B | * | 12/2021 | ............ B25J 13/088 |
| WO | WO-2021076453 | A1 | * | 4/2021 | ............ B25J 9/1602 |

OTHER PUBLICATIONS

S. Wang, Y. Li and B. Dong, "A Novel velocity estimation method for robotic joints based hyperbolic sine tracing differential algorithm," 2017 Chinese Automation Congress (CAC), Jinan, China, 2017, pp. 255-260 (Year: 2017).*

* cited by examiner

GAIT PLANNING METHOD, ROBOT AND COMPUTER-READABLE STORAGE MEDIUM

CROSS REFERENCE TO RELATED APPLICATIONS

This application claims priority to Chinese Patent Application No. CN 202210204305.9, filed Mar. 2, 2022, which is hereby incorporated by reference herein as if set forth in its entirety.

BACKGROUND

1. Technical Field

The present disclosure generally relates to robots, and particularly to a gait planning method, robot, and computer-readable storage medium.

2. Description of Related Art

Typically, in gait planning of robot, the internal state of a legged robot can be used instead of time to plan the controlled joints of the robot. This internal state may be referred to as a phase variable. Constructing the phase variable in the three-dimensional space enables the robot to have an internal clock, so that it can resist certain disturbances during walking without relying on an additional controller.

Using the internal state of the robot instead of time allows the robot to automatically adjust the swing time and the trajectory of the foot of a swing leg according to the disturbance to maintain a stable gait. However, the construction of this phase variable may cause excessive impact between the foot of the swinging leg and the support surface (floor, ground, etc.) when it touches the ground in advance, thus affecting the stability of gait.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
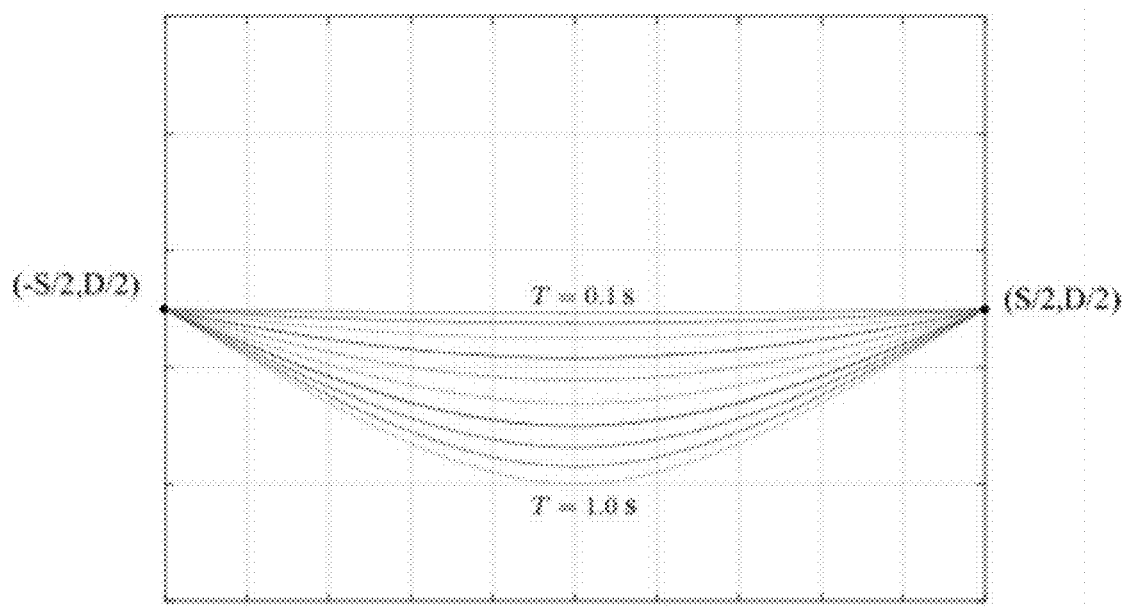
FIG. 1 is a schematic diagram of a periodic trajectory of linear inverted pendulum model.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

A legged robot is a complex mechanism with multiple degrees of freedom. A simplified model of the legged robot is generally used to study its motion characteristics. In one embodiment, a linear inverted pendulum model (LIPM) can be used to replace the complete model of the legged robot. The ankle joints of the legged robot are regarded as passive joints, so the whole robot is an underactuated system. Compared with conventional control methods based on zero moment point (ZMP), the method according to one embodiment of the present disclosure can make full use of gravity as the driving force of the robot to save energy and have higher walking efficiency and walking characteristics closer to humans.

In one embodiment, a coordinate system is established on the horizontal plane where the supporting ankle joint is located. The origin of the coordinate system is located at the supporting ankle joint. The positive direction of the x-axis of the coordinate system points to the advancing direction of the robot, the y-axis extends along the lateral direction of the robot, and the positive direction of the z-axis is vertically upward.

When the robot is simplified to LIPM and the ZMP is assumed to be (0,0), its dynamic model can be expressed as follows:

$$\ddot{x} = \omega^2 x$$

$$\ddot{y} = \omega^2 y$$

where x is the position of center of mass of LIPM on the x-axis, y is the position of center of mass of LIPM on the y-axis, $\ddot{x}$ is the acceleration of the center of mass of the LIPM on the x-axis, $\ddot{y}$ is the acceleration of the center of mass of the LIPM on the y-axis, $\omega = \sqrt{g/z}$, g is gravitational acceleration, and z is the height of the center of mass of LIPM from the ground.

For LIPM, its stable periodic trajectory is shown in FIG. 1. The larger the period (denoted as f), the larger the amplitude of the trajectory of the center of mass of LIPM. The center of mass will eventually pass through the point (S/2, D/2), where S is the step length of the robot, and D is the step width of the robot.

In one embodiment, a function (i.e., the phase variable $\Phi$) based on two position components of the robot's torso on the horizontal plane can be constructed. The position component on the x-axis is denoted as $x_w$, and the position component on the y-axis is denoted as $y_w$. The position of the robot's torso relative to the origin of the coordinate system (that is, the position of the waist) can be calculated using forward kinematics based on the feedback values of the joint angles.

$\Phi$ needs to meet two conditions: first, change from 0 to 1; second, strictly monotonically increasing. In order to ensure the condition that t must be equal to 1 at the end of each step, it needs to construct a functional relationship of the position of the torso along the x and y axes at the moment before the switching of the supporting feet. In one embodiment, a spatial two-dimensional plane that satisfies the following conditions can be constructed:

$$\mathbb{S} = \left\{ (x_w, y_w, z_w) \middle| \left( x_w - \frac{S}{2} \right) + C\left( y_w - \frac{D}{2} \right) = 0 \right\}.$$

Figure 2:
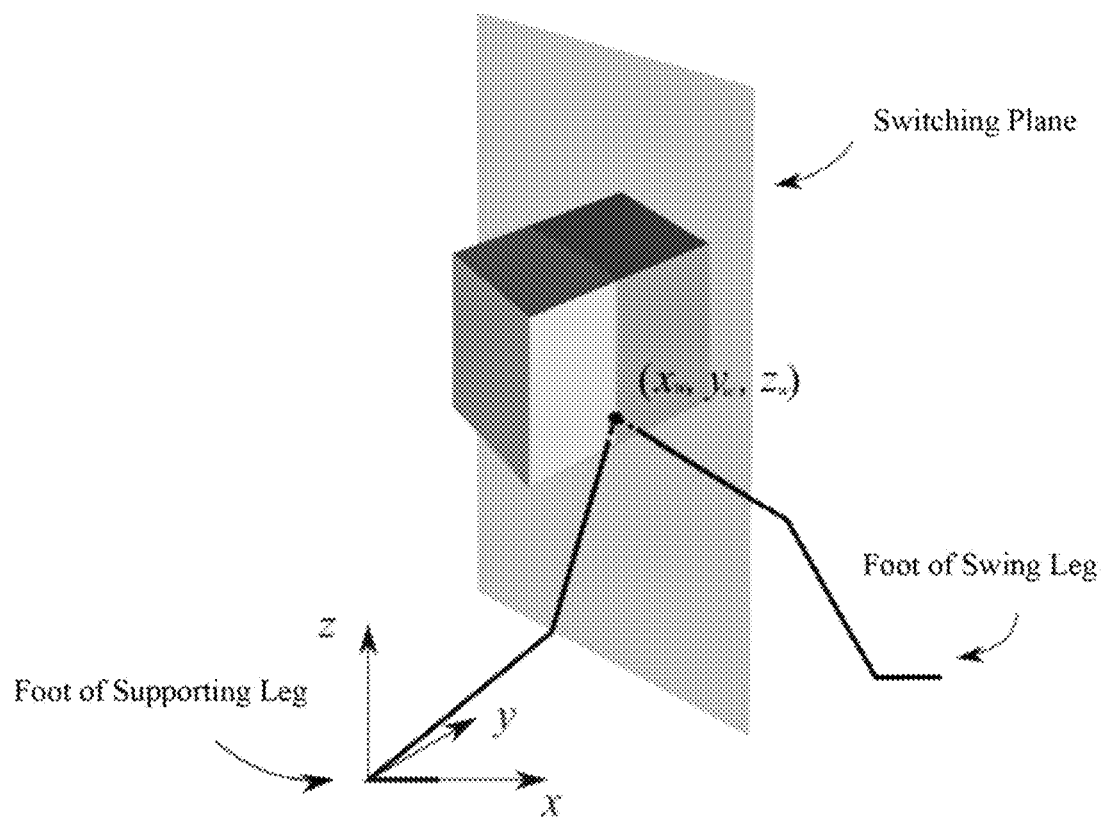
FIG. 2 is a schematic diagram of a switching plane of robot.

FIG. 2 is a schematic diagram of the plane $\mathbb{S}$, which is referred to a switching plane here, where $z_w$ is the position component of the robot's torso on the z-axis, and C is the slope parameter of the switching plane, and its specific value can be set according to actual needs, which is not specifically limited here. During the walking process, the height of the robot's torso is constrained so that it is in the same horizontal plane.

Figure 3:
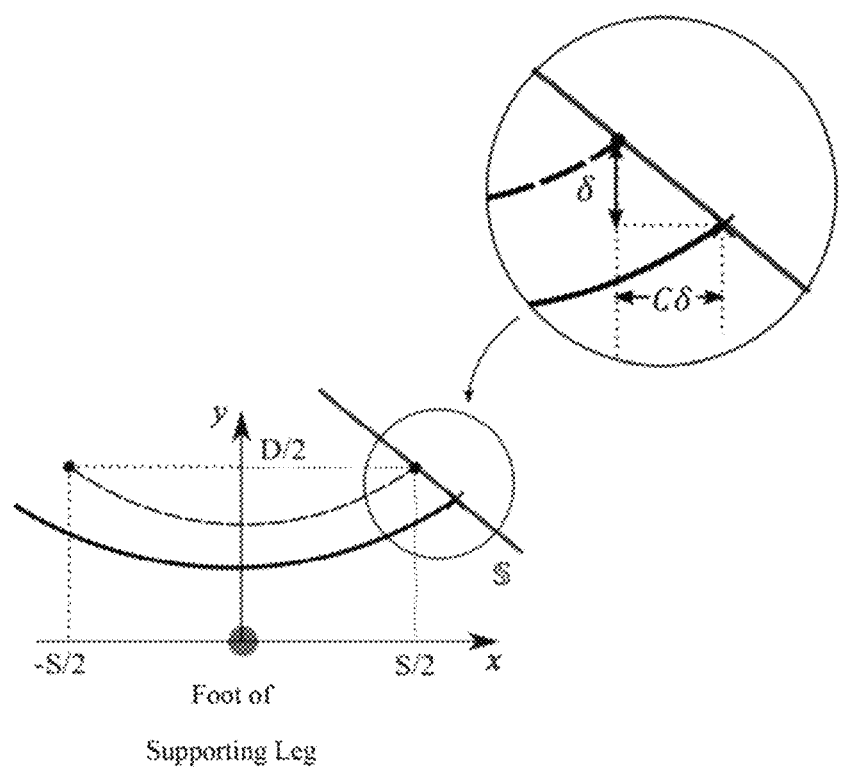
FIG. 3 is a schematic diagram of the position error relationship of robot.

FIG. 3 is a schematic diagram of the position error relationship of the robot. When the robot is simplified to LIPM, its stable periodic trajectory always starts from (−S/2, D/2) and ends at (S/2, D/2), as shown by the dotted line in FIG. 3. When the robot is disturbed, its motion trajectory will deviate from the original stable periodic trajectory, as shown by the solid line in FIG. 3. The intersection of the plane where the robot's torso is located and the switching plane can be regarded as a straight line, as shown in FIG. 3. This straight line defines the relationship between the position error of the torso in the x-axis and y-axis directions, namely: $\delta x_w = C \delta y_w$, where $\delta x_w$ is the position error component of the torso on the x-axis, and $\delta y_w$ is the position error component of the torso on the y-axis. When disturbed, the values of $\delta x_w$ and $\delta y_w$ are unknown, but always satisfy the relationship shown in the above equations.

During the walking process of the robot, the position of the foot of the swing leg and the swing time are very important factors affecting the stability of walking. When the robot is disturbed, the position and attitude of the robot will deviate from the original trajectory. If time variables are used to plan the controlled joints of the robot, early or late contact of the foot of the swing leg with the support surface will occur. Using the internal state of the robot instead of time allows the robot to automatically adjust the swing time and the trajectory of the foot of the swing leg according to the disturbance to maintain a stable gait. However, the construction of this phase variable may make the impact of the foot of the swing leg on the ground in advance, which will affect the stability of the gait.

In one embodiment, the phase variable in the three-dimensional space can be improved, so that the impact on the planned foot of the swing leg from the support surface becomes smaller when the planned foot of the swing leg comes into contact with the support surface in advance. As a result, the walking of the robot is more stable.

Figure 4:
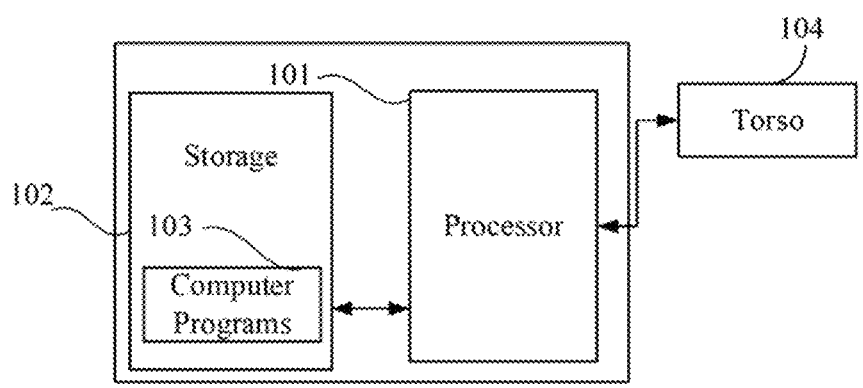
FIG. 4 is a schematic block diagram of a legged robot.
Figure 5:
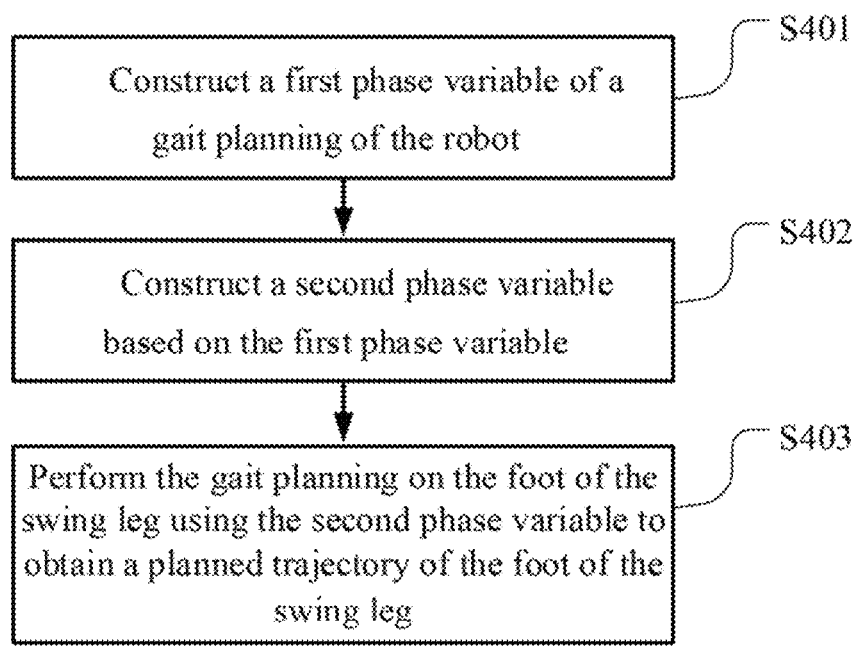
FIG. 5 is an exemplary flowchart of a gait planning method according to one embodiment.

FIG. 4 shows a schematic block diagram of a legged robot 10 according to one embodiment. The robot may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of the method for controlling the robot, such as steps S401 to S403 in FIG. 5, are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the robot, such as a hard disk or a memory. The storage 102 may also be an external storage device of the robot, such as a plug-in hard disk, a smart memory card (SMC), and a secure digital (SD) card, or any suitable flash cards. Furthermore, the storage 102 may also include both an internal storage unit and an external storage device. The storage 102 is used to store computer programs, other programs, and data required by the robot. The storage 102 can also be used to temporarily store data that have been output or is about to be output.

Figure 9:
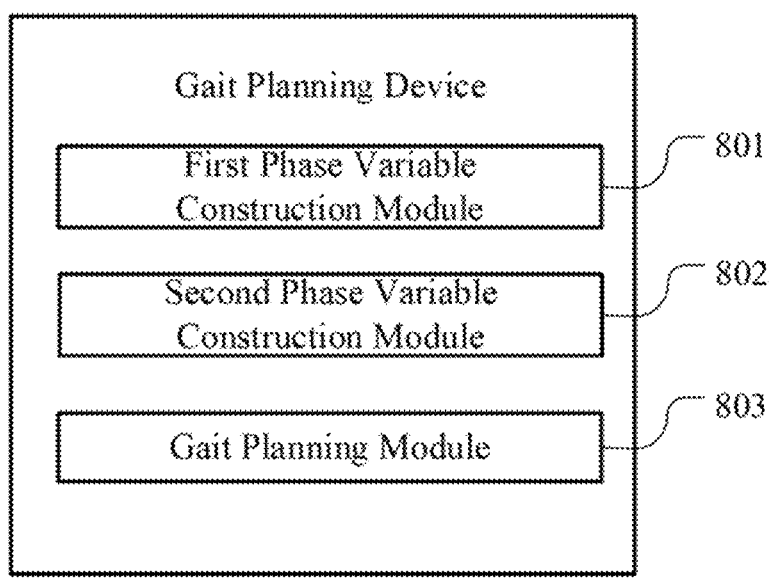
FIG. 9 is a schematic block diagram of gait planning device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the robot. For example, the one or more computer programs 103 may be divided into a first phase variable construction module 801, a second phase variable construction module 802, and a gait planning module 803 as shown in FIG. 9.

In one embodiment, the robot may further include a torso 104 electrically connected to the processor 101.

It should be noted that the block diagram shown in FIG. 4 is only an example of the robot. The robot may include more or fewer components than what is shown in FIG. 4, or have a different configuration than what is shown in FIG. 4. Each component shown in FIG. 4 may be implemented in hardware, software, or a combination thereof.

Referring to FIG. 5, in one embodiment, a gait planning method for controlling the robot 10 may include the following steps.

Step 401: Construct a first phase variable of a gait planning of the robot.

In a two-dimension space, the phase variable can be the displacement of the robot along the direction of travel, or the angle between the supporting leg and the support surface (e.g., floor, ground, etc.). In a three-dimensional space, the phase variable needs to consider two components of the state of the robot on the horizontal plane at the same time, such as the displacement of the robot's torso in the direction of travel and lateral direction. The displacement in the direction of travel is increasing, and the displacement in the lateral direction is non-monotonic. However, in one embodiment, a monotonically increasing phase variable needs to be constructed based on the two displacements, which is referred to as the first phase variable.

Figure 6:
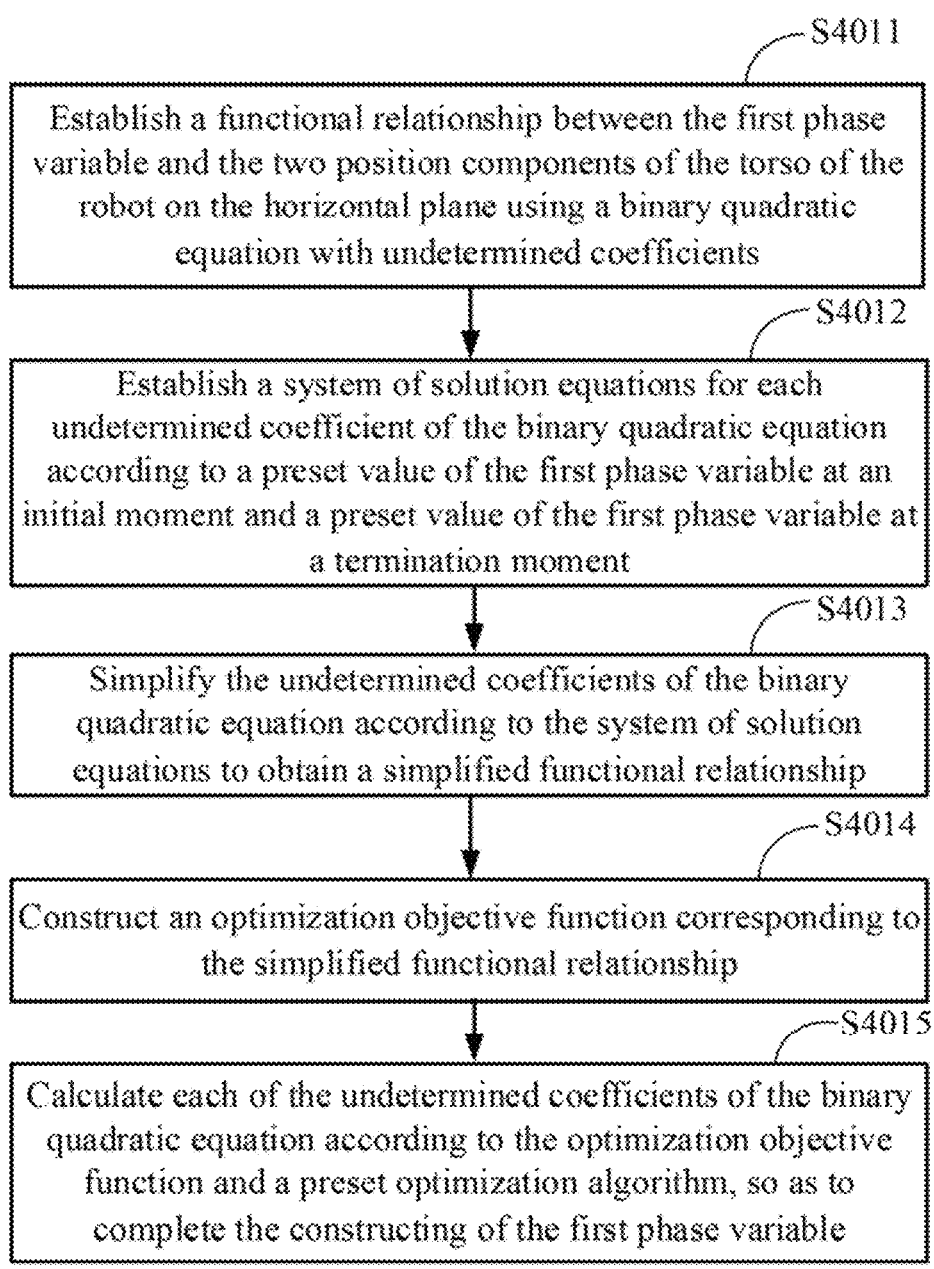
FIG. 6 is an exemplary flowchart of a method for constructing a first phase variable of gait planning of robot.

Referring to FIG. 6, in one embodiment, the step S401 may include the following steps.

Step S4011: Establish a functional relationship between the first phase variable and the two position components of the torso of the robot on the horizontal plane using a binary quadratic equation with undetermined coefficients.

In one embodiment, the functional relationship can be established as follows: $\Phi=a_1x_w+a_2y_w+a_3x_wy_w+a_4x_w^2+a_5y_w^2+a_6$, where $a_1$, $a_2$, $a_3$, $a_4$, $a_5$ and $a_6$ are the undetermined coefficients.

Step S4012: Establish a system of solution equations for each undetermined coefficient of the binary quadratic equation according to a preset value of the first phase variable at an initial moment and a preset value of the first phase variable at a termination moment.

In one embodiment, a first solution equation of the binary quadratic equation can be established according to the preset value of the first phase variable at the initial moment. It can be seen from the above-mentioned analysis that the first phase variable is always 0 at the initial moment, that is, $\Phi(x_{w0},y_{w0})=0$, where $(x_{w0},y_{w0})$ are the two position components of the robot's torso on the horizontal plane at the initial moment, which can be calculated according to the end state of the robot's last step, and are known quantities. $\Phi(x_{w0},y_{w0})$ is the value of the first phase variable at the initial moment, and when it is substituted into the above-mentioned functional relationship, the first solution equation can be obtained as follows: $a_1x_{w0}+a_2y_{w0}+a_3x_{w0}y_{w0}+a_4x_{w0}^2+a_5y_{w0}^2+a_6=0$.

In one embodiment, a second solution equation of the binary quadratic equation can be established according to the preset value of the first phase variable at the termination moment. It can be seen from the above-mentioned analysis that the phase variable is equal to 1 at the termination moment, that is, $\Phi(x_{wf},y_{wf})=1$, where $(x_{wf},y_{wf})$ are the two position components of the robot's torso on the horizontal plane at the termination moment. In an ideal state, $$x_{wf}=\frac{S}{2},$$
$$y_{wf}=\frac{D}{2}.$$

In the case of being disturbed, $$x_{wf}=\frac{S}{2}+\delta x_w,\ y_{wf}=\frac{D}{2}+\delta y_w.\ \Phi(x_{wf},y_{wf})$$

is the value of the first phase variable at the termination moment, and when it is substituted into the above-mentioned functional relationship, the second solution equation can be obtained as follows:

$$a_1\left(\frac{S}{2}+\delta x_w\right)+a_2\left(\frac{D}{2}+\delta y_w\right)+$$
$$a_3\left(\frac{S}{2}+\delta x_w\right)\left(\frac{D}{2}+\delta y_w\right)+a_4\left(\frac{S}{2}+\delta x_w\right)^2+a_5\left(\frac{D}{2}+\delta y_w\right)^2+a_6=1.$$

For the convenience of description, in subsequent calculations, $\delta y_w$ will be abbreviated as $\delta$. When the position error relationship $\delta x_w = C\delta y_w$ is substituted into the second solution equation, an equation can be obtained as follows:

$$a_1\left(\frac{S}{2}+C\delta\right)+a_2\left(\frac{D}{2}+\delta\right)+$$
$$a_3\left(\frac{S}{2}+C\delta\right)\left(\frac{D}{2}+\delta\right)+a_4\left(\frac{S}{2}+C\delta\right)^2+a_5\left(\frac{D}{2}+\delta\right)^2+a_6=1.$$

For any $\delta$, the constraints in the above-mentioned equations must be satisfied. Therefore, the coefficients in front of all terms containing $\delta$ in the above-mentioned equations must be equal to 0, and the sum of the remaining terms must be equal to 1. Therefore, from the above-mentioned equation, the derived solution equations as shown below can be obtained:

$$a_1(S/2)+a_2(D/2)+a_3(S/2)(D/2)+a_4(S/2)^2+a_5(D/2)^2+a_6=1;$$

$$-a_3C+a_4C^2+a_5=0;$$

$$-a_1C+a_2-a_3C(D/2)+a_3(S/2)-2a_4C(S/2)+2a_5(D/2)=0.$$

Finally, the first solution equation and each derivative solution equation of and the second solution equation can be used as the system of solution equations as shown below:

$$\begin{cases} a_1x_{w0}+a_2y_{w0}+a_3x_{w0}y_{w0}+a_4x_{w0}^2+a_5y_{w0}^2+a_6=0 \\ a_1(S/2)+a_2(D/2)+a_3(S/2)(D/2)+a_4(S/2)^2+a_5(D/2)^2+a_6=1 \\ -a_3C+a_4C^2+a_5=0 \\ -a_1C+a_2-a_3C(D/2)+a_3(S/2)-2a_4C(S/2)+2a_5(D/2)=0 \end{cases}.$$

Step S4013: Simplify the undetermined coefficients of the binary quadratic equation according to the system of solution equations to obtain a simplified functional relationship.

The system of solution equations contains 4 equations and 6 unknowns, namely undetermined coefficients $a_1$, $a_2$, $a_3$, $a_4$, $a_5$ and $a_6$. Four of the undetermined coefficients can be regarded as functions of the remaining two undetermined coefficients as variables. For example, $a_1$, $a_2$, $a_3$, and $a_4$ can be selected to be regarded as functions of $a_5$ and $a_6$ as variables respectively. In this case, the 6 undetermined coefficients can be simplified to 2 undetermined coefficients, thus obtaining the simplified functional relationship.

Step S4014: Construct an optimization objective function corresponding to the simplified functional relationship.

In one embodiment, the following optimization objective function can be constructed: $J=\Sigma(\Phi(t_i)-t_i/T)^2$, where $t_i$ is an i-th moment in the cycle of LIPM, $\Phi(t_i)$ is a value of the first phase variable corresponding to $t_i$, and J is the optimization objective function. Since the first phase variable must keep increasing monotonically during the completion of a step, this optimization objective function selects several moments from the cycle of LIPM. For the i-th moment. $(\Phi(t_i)-t_i/T)^2$ is used to measure the deviation between the first phase variable and the normalized time variable. The total deviation obtained by accumulating the deviations at each selected moment is the optimization objective function.

Step S4015: Calculate each of the undetermined coefficients of the binary quadratic equation according to the optimization objective function and a preset optimization algorithm, so as to complete the constructing of the first phase variable.

In one embodiment, any conventional optimization algorithm can be selected according to actual needs, including but not limited to stochastic gradient descent approach, momentum algorithm, Adam algorithm and other optimization algorithms. The undetermined coefficients of the binary quadratic equation can be obtained by solving, so as to complete the construction of the first phase variable.

Step S402: Construct a second phase variable based on the first phase variable.

Figure 7:
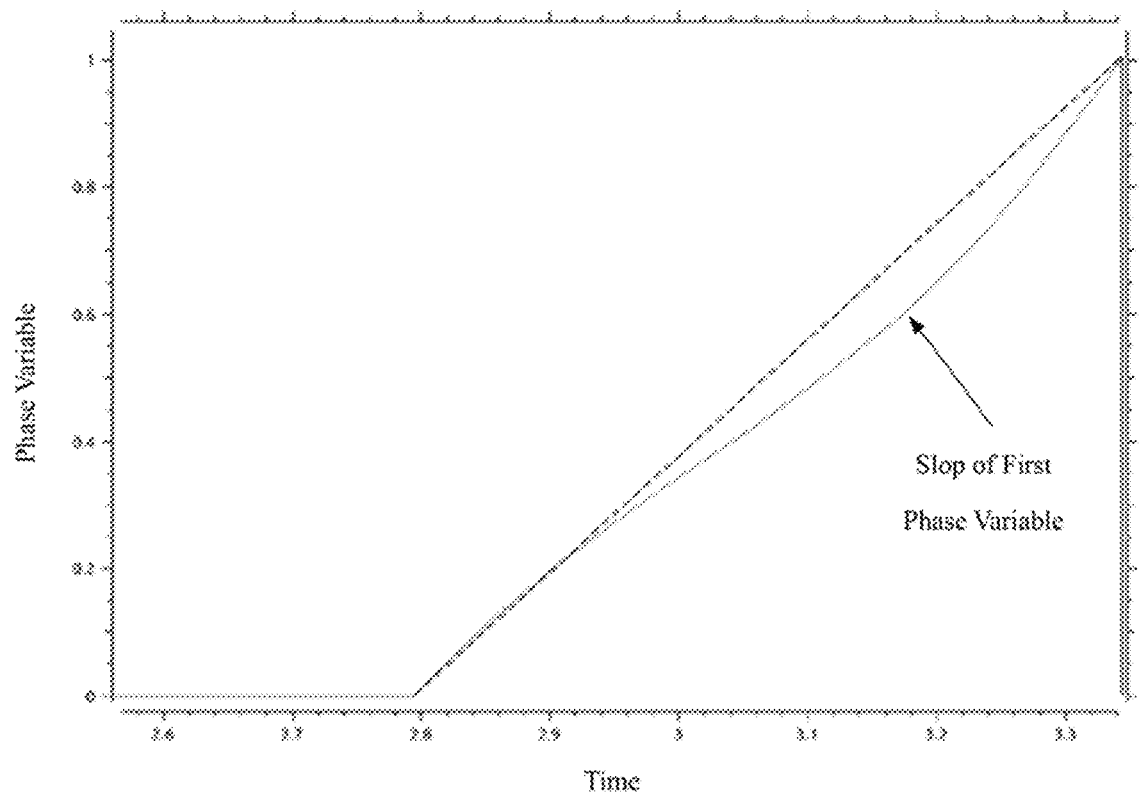
FIG. 7 is a schematic diagram of the first phase variable.

FIG. 7 is a schematic diagram of the first phase variable. When the first phase variable is used to plan the height of the foot of the swinging leg (denoted as $z_s$), the speed of the foot of the swinging leg (denoted as $\dot{z}_s$), i.e., the time-based derivative of the position of the foot of the swing leg, is as follows:

$$\dot{z}_s = \frac{\partial z_s}{\partial \Phi} \dot{\Phi}.$$

When the value of the first phase variable is close to 1, that is, when the foot of the swinging leg is about to contact the support surface, the slope of the first phase variable increases. That is, as $\dot{\Phi}$ increases, and the value of $\dot{z}_s$ increases accordingly. Once the foot of the swinging leg contacts the support surface in advance, a large impact will be generated between the foot of the swing leg and the support surface, which will affect the stability of the robot's walking.

In one embodiment, the phase variable $\Phi$ can be improved so that when the value of $\Phi$ is close to 1, the slope of $\Phi$ is as small as possible, and it must be ensured that the initial value and final value of $\Phi$ remain unchanged, which are equal to 0 and 1 respectively. For example, a preset inverse hyperbolic sine function may be used to process the first phase variable to obtain a new phase variable, which is referred to as the second phase variable.

In one embodiment, the first phase variable can be processed according to the following equation:

$$\Phi^* = \frac{ar\sinh(n\Phi)}{ar\sinh(n)},$$

where arsinh is the inverse hyperbolic sine function, n is a preset adjustment coefficient, which can be set according to actual needs. For example, it can be set to 1, 2, 3, . . . and the like. $\Phi^*$ is the second phase variable.

Figure 8:
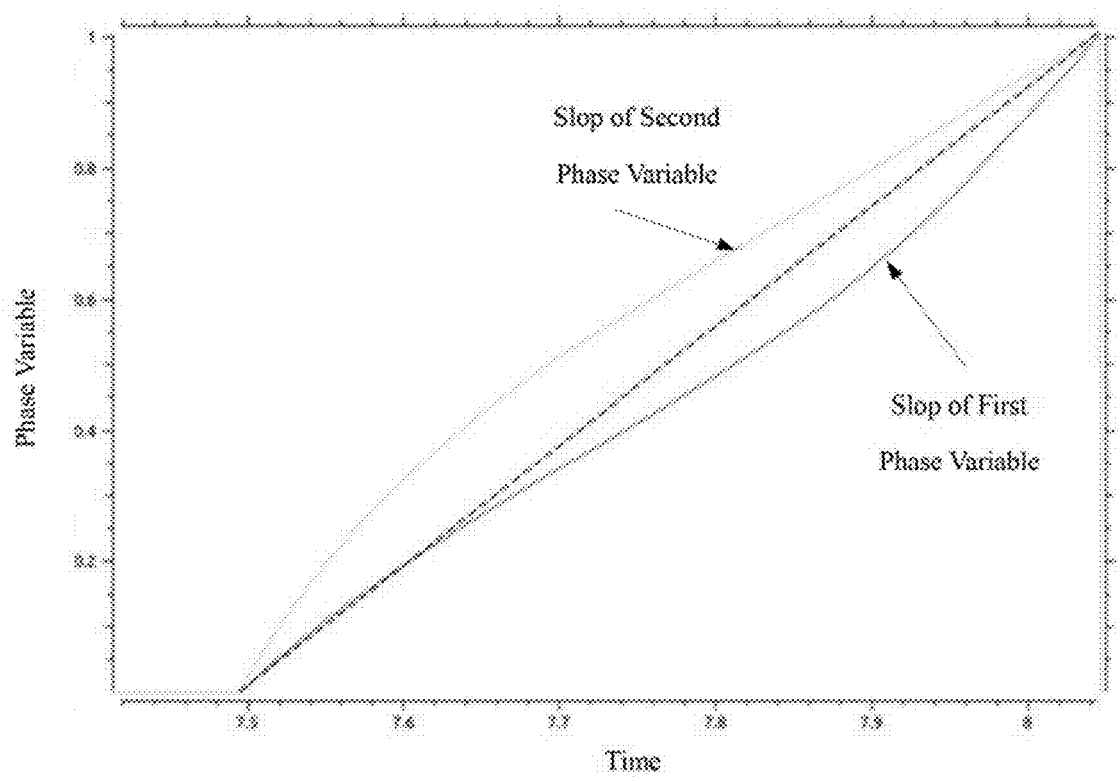
FIG. 8 is a comparative schematic diagram of the first phase variable and a second phase variable.

The comparison between the improved second phase variable and the original first phase variable is shown in FIG. 8. It can be seen that the slope of the improved second phase variable at the moment before the striking of the foot of the swing leg is significantly reduced compared with the original first phase variable, which has an important contribution to reducing the impact between the foot of the swinging leg and the support surface.

It should be noted that the above-mentioned construction process of the second phase variable is only an example. In practical applications, other second phase variables can be constructed according to the actual needs. However, it must be ensured that the slope of the second phase variable is smaller than the slope of the first phase variable at the moment before the foot of the swing leg of the robot starts to contact the support surface.

Step S403: Perform the gait planning on the foot of the swing leg using the second phase variable to obtain a planned trajectory of the foot of the swing leg.

Firstly, the trajectory of the foot of the swinging leg in the direction of each coordinate axis can be expressed as a function of the second phase variable. The trajectory in the x-axis direction is denoted as $x_s(\Phi^*)$, the trajectory in the y-axis direction is denoted as $y_s(\Phi^*)$, and the trajectory in the z-axis direction is denoted as $z_s(\Phi^*)$.

Then, the boundary conditions of the trajectories of the foot of the swinging leg in the directions of the respective coordinate axes can be determined respectively.

In one embodiment, the boundary condition of the trajectory in the x-axis direction is expressed as follows:

$$x_s(0)=x_{w0}, x_s(1)=S; \dot{x}_s(0)=\dot{x}_{w0}, \dot{x}_s(1)=0.$$

In one embodiment, the boundary condition of the trajectory in the y-axis direction is expressed as follows:

$$y_s(0)=y_{w0}, y_s(1)=D; \dot{y}_s(0)=\dot{y}_{w0}, \dot{y}_s(1)=0.$$

$\dot{x}_{w0}$ is the speed of the robot's torso in the x-axis direction at the initial moment, and $\dot{y}_{w0}$ is the speed of the robot's torso in the y-axis direction at the initial moment, both of which can be calculated according to the end state of the robot's last step, and are known quantities.

In one embodiment, the boundary condition of the trajectory in the z-axis direction is expressed as follows:

$$z_s(0)=0, z_s(\Phi_m)=h_s, z_s(1)=0;$$

$$\dot{z}_s(0)=0, \dot{z}_s(\Phi_m)=0, \dot{z}_s(1)=0.$$

$h_s$ is the maximum height of the foot of the swing leg, $0<\Phi_m<1$, which is an intermediate value of $\Phi^*$. When $\Phi^*=\Phi_m$, the foot of the swing leg reaches the maximum height.

Finally, curve fitting can be performed on the trajectories of the robot's foot of the swing leg in the preset directions of each coordinate axis according to the boundary conditions, and the planned trajectories of the foot of the swing leg in the directions of each preset coordinate axes can be obtained.

In one embodiment, any conventional curve fitting algorithm can be selected according to actual needs, including but not limited to curve fitting algorithms based on cubic polynomial curves, S-curves, cubic splines, cubic Hermite curves, and Bezier curves. A smooth curve transitioning from the initial state to the final state, i.e., the planned trajectory of the foot of the swing leg, is determined by curve fitting. The robot can then be controlled to move according to the planned trajectory of the foot of the swing leg.

In summary, according to the embodiments above, the following operations are performed: constructing a first phase variable of a gait planning of the robot, wherein the first phase variable is a function of two position components of a torso of the robot on a horizontal plane; constructing a second phase variable based on the first phase variable, wherein the second phase variable is a function of the first phase variable, and a slope of the second phase variable is smaller than a slope of the first phase variable when a foot of a swing leg of the robot starts to touch a support surface; and performing the gait planning on the foot of the swing leg using the second phase variable to obtain a planned trajectory of the foot of the swing leg. By implementing the method above, the phase variable (i.e., the first phase variable) constructed based on the state of the robot is improved, and the slope of the improved phase variable (i.e., the second phase variable) at the moment before the foot of the swing leg starts to contact the ground is smaller. Using the improved phase variable to plan the gait of the foot of the swing leg can make the impact between the foot of the swing leg and the ground smaller, thereby enhancing the stability of the robot's walking.

It should be understood that sequence numbers of the foregoing processes do not mean an execution sequence in this embodiment of this disclosure. The execution sequence of the processes should be determined according to functions and internal logic of the processes, and should not be construed as any limitation on the implementation processes of this embodiment of this disclosure.

Corresponding to the gait planning method described in the embodiments above, FIG. 9 shows a schematic block diagram of a gait planning device. In one embodiment, the gait planning device may include a first phase variable construction module 801, a second phase variable construction module 802, and a gait planning module 803. The first phase variable construction module 801 is to construct a first phase variable of a gait planning of the robot. The first phase variable is a function of two position components of a torso of the robot on a horizontal plane. The second phase variable construction module 802 is to construct a second phase variable based on the first phase variable. The second phase variable is a function of the first phase variable, and a slope of the second phase variable is smaller than a slope of the first phase variable when a foot of a swing leg of the robot starts to touch a support surface. The gait planning module 803 is to perform the gait planning on the foot of the swing leg using the second phase variable to obtain a planned trajectory of the foot of the swing leg.

In one embodiment, the second phase variable construction module 802 is to process the first phase variable using a preset inverse hyperbolic sine function to obtain the second phase variable.

In one embodiment, second phase variable construction module 802 is to process the first phase variable according to the following equation:

$$\Phi^* = \frac{ar\sinh(n\Phi)}{ar\sinh(n)},$$

where $\Phi$ represents the first phase variable, arsinh represents the inverse hyperbolic sine function, n is a preset adjustment coefficient, and $\Phi^*$ represents the second phase variable.

The functional relationship establishing unit is to establish a functional relationship between the first phase variable and the two position components of the torso of the robot on the horizontal plane using a binary quadratic equation with undetermined coefficients. The system of solution equations establishing unit is to establish a system of solution equations for each undetermined coefficient of the binary quadratic equation according to a preset value of the first phase variable at an initial moment and a preset value of the first phase variable at a termination moment. The coefficient simplifying unit is to simplify a number of the undetermined coefficients of the binary quadratic equation according to the system of solution equations to obtain a simplified functional relationship. The optimization objective function constructing unit is to construct an optimization objective function corresponding to the simplified functional relationship. The coefficient calculation unit is to calculate each of the undetermined coefficients of the binary quadratic equation according to the optimization objective function and a preset optimization algorithm, so as to complete the constructing of the first phase variable.

The functional relationship establishing unit is to establish a functional relationship between the first phase variable and the two position components of the torso of the robot on the horizontal plane using a binary quadratic equation with undetermined coefficients. The system of solution equations establishing unit is to establish a system of solution equations for each undetermined coefficient of the binary quadratic equation according to a preset value of the first phase variable at an initial moment and a preset value of the first phase variable at a termination moment. The coefficient simplifying unit is to simplify a number of the undetermined coefficients of the binary quadratic equation according to the system of solution equations to obtain a simplified functional relationship. The optimization objective function constructing unit is to constructing an optimization objective function corresponding to the simplified functional relationship. The coefficient calculation unit is to calculate each of the undetermined coefficients of the binary quadratic equation according to the optimization objective function and a preset optimization algorithm, so as to complete the constructing of the first phase variable.

In one embodiment, the functional relationship establishing unit is to establish the functional relationship as follows: $\Phi = a_1 x_w + a_2 y_w + a_3 x_w y_w + a_4 x_w^2 + a_5 y_w^2 + a_6$, where $x_w$ and $y_w$ represents the two position components of the torso of the robot on the horizontal plane, $a_1, a_2, a_3, a_4, a_5$ and $a_6$ are the undetermined coefficients, and $\Phi$ is the phase variable.

In one embodiment, the system of solution equations establishing unit may include a first solution equation establishing unit, a second solution equation establishing unit, a derivative solution equation establishing unit, and a system of solution equations establishing sub-unit.

The first solution equation establishing unit is to establish a first solution equation of the binary quadratic equation according to the preset value of the first phase variable at the initial moment. The second solution equation establishing unit is to establish a second solution equation of the binary quadratic equation according to the preset value of the first phase variable at the termination moment. The derivative solution equation establishing unit is to substitute a preset position error relationship into the second solution equation to obtain derivative solution equations of the second solution equation, wherein the position error relationship is a relationship between two position error components of the torso of the robot on the horizontal plane. The system of solution equations establishing sub-unit is to use the first solution equation and the derivative solution equations of the second solution equation as the system of solution equations.

In one embodiment, the optimization objective function is as follows: $J = \Sigma(\Phi(t_i) - t_i/T)^2$, where T is a cycle of a linear inverted pendulum model of the robot, $t_i$ is an i-th moment in the cycle, $\Phi(t_i)$ is a value of the first phase variable corresponding $t_i$, and J is the optimization objective function It should be noted that the basic principles and technical effects of the gait planning device are the same as the aforementioned method. For a brief description, for parts not mentioned in this device embodiment, reference can be made to corresponding description in the method embodiments.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent pan, or each of the modules may be independent, or two or more modules may be integrated into one independent part. in addition, functional modules in the embodiments of the present disclosure may be integrated into one independent pan, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the robot may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a LAB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented gait planning method for a robot, comprising:
   constructing, by a processor of the robot, a first phase variable for gait planning of the robot, wherein the first phase variable is a function of two position components of a torso of the robot on a horizontal plane;
   determining, by the processor, a product of the first phase variable and a preset adjustment coefficient, and obtaining a ratio between an inverse hyperbolic sine function of the product and an inverse hyperbolic sine function of the preset adjustment coefficient as a second phase variable;
   performing, by the processor, the gait planning on a foot of a swing leg of the robot using the second phase variable to obtain a planned trajectory of the foot of the swing leg; and
   controlling, by the processor, the robot to move according to the planned trajectory of the foot of the swing leg.

2. The method of claim 1, wherein constructing the first phase variable of the gait planning of the robot comprises:
   establishing a functional relationship between the first phase variable and the two position components of the torso of the robot on the horizontal plane using a binary quadratic equation with undetermined coefficients;
   establishing a system of solution equations for each undetermined coefficient of the binary quadratic equation according to a preset value of the first phase variable at an initial moment and a preset value of the first phase variable at a termination moment;
   simplifying a number of the undetermined coefficients of the binary quadratic equation according to the system of solution equations to obtain a simplified functional relationship;
   constructing an optimization objective function corresponding to the simplified functional relationship; and
   calculating each of the undetermined coefficients of the binary quadratic equation according to the optimization objective function and a preset optimization algorithm, so as to complete the constructing of the first phase variable.

3. The method of claim 2, wherein establishing the functional relationship between the first phase variable and the two position components of the torso of the robot on the horizontal plane using the binary quadratic equation with undetermined coefficients, comprises:
   establishing the functional relationship as follows: $\Phi=a_1x_w+a_2y_w+a_3x_wy_w+a_4x_w^2+a_5y_w^2+a_6$, where $x_w$ and $y_w$ represent the two position components of the torso of the robot on the horizontal plane, $a_1, a_2, a_3, a_4, a_5$ and $a_6$ are the undetermined coefficients, and $\Phi$ is the first phase variable.

4. The method of claim 2, wherein establishing the system of solution equations for each undetermined coefficient of the binary quadratic equation according to the preset value of the first phase variable at the initial moment and the preset value of the first phase variable at the termination moment, comprises:
   establishing a first solution equation of the binary quadratic equation according to the preset value of the first phase variable at the initial moment;
   establishing a second solution equation of the binary quadratic equation according to the preset value of the first phase variable at the termination moment;
   substituting a preset position error relationship into the second solution equation to obtain derivative solution equations of the second solution equation, wherein the position error relationship is a relationship between two position error components of the torso of the robot on the horizontal plane; and
   using the first solution equation and the derivative solution equations of the second solution equation as the system of solution equations.

5. The method of claim 2, wherein the optimization objective function is as follows: $J=\Sigma(\Phi(t_i)-t_i/T)^2$, where T is a cycle of a linear inverted pendulum model of the robot, $t_i$ is an i-th moment in the cycle, $\Phi(t_i)$ is a value of the first phase variable corresponding $t_i$, and J is the optimization objective function.

6. A robot comprising:
   one or more processors; and
   a memory coupled to the one or more processors, the memory storing programs that, when executed by the one or more processors, cause performance of operations comprising:
   constructing a first phase variable for gait planning of the robot, wherein the first phase variable is a function of two position components of a torso of the robot on a horizontal plane;
   determining a product of the first phase variable and a preset adjustment coefficient, and obtaining a ratio between an inverse hyperbolic sine function of the product and an inverse hyperbolic sine function of the preset adjustment coefficient as a second phase variable; and
   performing the gait planning on a foot of a swing leg of the robot using the second phase variable to obtain a planned trajectory of the foot of the swing leg, and controlling the robot to move according to the planned trajectory of the foot of the swing leg.

7. The robot of claim 6, wherein constructing the first phase variable of the gait planning of the robot comprises:

establishing a functional relationship between the first phase variable and the two position components of the torso of the robot on the horizontal plane using a binary quadratic equation with undetermined coefficients;

establishing a system of solution equations for each undetermined coefficient of the binary quadratic equation according to a preset value of the first phase variable at an initial moment and a preset value of the first phase variable at a termination moment;

simplifying a number of the undetermined coefficients of the binary quadratic equation according to the system of solution equations to obtain a simplified functional relationship;

constructing an optimization objective function corresponding to the simplified functional relationship; and calculating each of the undetermined coefficients of the binary quadratic equation according to the optimization objective function and a preset optimization algorithm, so as to complete the constructing of the first phase variable.

8. The robot of claim 7, wherein establishing the functional relationship between the first phase variable and the two position components of the torso of the robot on the horizontal plane using the binary quadratic equation with undetermined coefficients, comprises:

establishing the functional relationship as follows: $\Phi=a_1 x_w + a_2 y_w + a_3 x_w y_w + a_4 x_w^2 + a_5 y_w^2 + a_6$, where $x_w$ and $y_w$ represent the two position components of the torso of the robot on the horizontal plane, $a_1$, $a_2$, $a_3$, $a_4$, $a_5$ and $a_6$ are the undetermined coefficients, and $\Phi$ is the first phase variable.

9. The robot of claim 7, wherein establishing the system of solution equations for each undetermined coefficient of the binary quadratic equation according to the preset value of the first phase variable at the initial moment and the preset value of the first phase variable at the termination moment, comprises:

establishing a first solution equation of the binary quadratic equation according to the preset value of the first phase variable at the initial moment;

establishing a second solution equation of the binary quadratic equation according to the preset value of the first phase variable at the termination moment;

substituting a preset position error relationship into the second solution equation to obtain derivative solution equations of the second solution equation, wherein the position error relationship is a relationship between two position error components of the torso of the robot on the horizontal plane; and using the first solution equation and the derivative solution equations of the second solution equation as the system of solution equations.

10. The robot of claim 7, wherein the optimization objective function is as follows: $J=\Sigma(\Phi(t_i)-t_i/T)^2$, where T is a cycle of a linear inverted pendulum model of the robot, $t_i$ is an i-th moment in the cycle, $\Phi(t_i)$ is a value of the first phase variable corresponding $t_i$, and J is the optimization objective function.

11. A non-transitory computer-readable storage medium storing instructions that, when executed by at least one processor of a robot, cause the at least one processor to perform a gait planning method, the method comprising:

constructing a first phase variable for gait planning of the robot, wherein the first phase variable is a function of two position components of a torso of the robot on a horizontal plane;

determining a product of the first phase variable and a preset adjustment coefficient, and obtaining a ratio between an inverse hyperbolic sine function of the product and an inverse hyperbolic sine function of the preset adjustment coefficient as a second phase variable; and performing the gait planning on a foot of a swing leg of the robot using the second phase variable to obtain a planned trajectory of the foot of the swing leg, and controlling the robot to move according to the planned trajectory of the foot of the swing leg.

12. The non-transitory computer-readable storage medium of claim 11, wherein constructing the first phase variable of the gait planning of the robot comprises:

establishing a functional relationship between the first phase variable and the two position components of the torso of the robot on the horizontal plane using a binary quadratic equation with undetermined coefficients;

establishing a system of solution equations for each undetermined coefficient of the binary quadratic equation according to a preset value of the first phase variable at an initial moment and a preset value of the first phase variable at a termination moment;

simplifying a number of the undetermined coefficients of the binary quadratic equation according to the system of solution equations to obtain a simplified functional relationship;

constructing an optimization objective function corresponding to the simplified functional relationship; and calculating each of the undetermined coefficients of the binary quadratic equation according to the optimization objective function and a preset optimization algorithm, so as to complete the constructing of the first phase variable.

13. The non-transitory computer-readable storage medium of claim 12, wherein establishing the functional relationship between the first phase variable and the two position components of the torso of the robot on the horizontal plane using the binary quadratic equation with undetermined coefficients, comprises:

establishing the functional relationship as follows: $\Phi=a_1 x_w + a_2 y_w + a_3 x_w y_w + a_4 x_w^2 + a_5 y_w^2 + a_6$, where $x_w$ and $y_w$ represent the two position components of the torso of the robot on the horizontal plane, $a_1$, $a_2$, $a_3$, $a_4$, $a_5$ and $a_6$ dare the undetermined coefficients, and $\Phi$ is the first phase variable.

14. The non-transitory computer-readable storage medium of claim 12, wherein establishing the system of solution equations for each undetermined coefficient of the binary quadratic equation according to the preset value of the first phase variable at the initial moment and the preset value of the first phase variable at the termination moment, comprises:

establishing a first solution equation of the binary quadratic equation according to the preset value of the first phase variable at the initial moment;

establishing a second solution equation of the binary quadratic equation according to the preset value of the first phase variable at the termination moment;

substituting a preset position error relationship into the second solution equation to obtain derivative solution equations of the second solution equation, wherein the position error relationship is a relationship between two position error components of the torso of the robot on the horizontal plane; and using the first solution equation and the derivative solution equations of the second solution equation as the system of solution equations.

15. The method of claim 1, wherein the preset adjustment coefficient is an integer greater than 0, and;
wherein the first phase variable is a monotonically increasing phase variable, and is constructed based on displacements of the torso of the robot in direction of travel and lateral direction on the horizontal plane.

16. The method of claim 1, wherein the robot is a legged robot, and a coordinate system is established on a horizontal plane where an ankle joint of a supporting leg of the robot is located, wherein origin of the coordinate system is located at the ankle joint of the supporting leg of the robot, a positive direction of x-axis of the coordinate system points to advancing direction of the robot, y-axis of the coordinate system extends along lateral direction of the robot, and a positive direction of z-axis of the coordinate system is vertically upward; and
wherein performing, by the processor, the gait planning on the foot of the swing leg using the second phase variable to obtain the planned trajectory of the foot of the swing leg, comprises:
expressing, by the processor, trajectories of the foot of the swinging leg in directions of each coordinate axis of the coordinate system as a function of the second phase variable;
determining boundary conditions of the trajectories of the foot of the swinging leg in the directions of each coordinate axis of the coordinate system, respectively; and
performing curve fitting on the trajectories of the foot of the swinging leg in the directions of each coordinate axis of the coordinate system according to the boundary conditions, and obtaining planned trajectories of the foot of the swinging leg in the directions of each coordinate axis of the coordinate system, wherein the curve fitting is for determining a smooth curve transitioning from an initial state to a final state of the foot of the swinging leg.

17. The method of claim 4, wherein the robot is a legged robot, and a coordinate system is established on a horizontal plane where an ankle joint of a supporting leg of the robot is located, wherein origin of the coordinate system is located at the ankle joint of the supporting leg of the robot, a positive direction of x-axis of the coordinate system points to advancing direction of the robot, y-axis of the coordinate system extends along lateral direction of the robot, and a positive direction of z-axis of the coordinate system is vertically upward;
wherein a spatial two-dimensional plane satisfying following conditions is constructed:

$$\mathbb{S}=\{(x_w, y_w, z_w)|(x_w-s/2)+C(y_w-D/2)=0\};$$

where, $\mathbb{S}$ is the spatial two-dimensional plane, $x_w$ is a position component of the torso of the robot on the x-axis, $y_w$ is a position component of the torso of the robot on the y-axis, $z_w$ is a position component of the torso of the robot on the z-axis, S is a step length of the robot, D is a step width of the robot, and C is a slope parameter of the spatial two-dimensional plane; and
wherein an intersection of a plane where the torso of the robot torso is located and the spatial two-dimensional plane is regarded as a straight line, and the straight line defines the relationship between the two position error components of the torso of the robot in directions of the x-axis and the y-axis on the horizontal plane.

18. The method of claim 4, wherein the first phase variable is always 0 at the initial moment, and the first phase variable is equal to 1 at the termination moment.

19. The method of claim 2, wherein the system of solution equations comprises a plurality of undetermined coefficients, and the simplified functional relationship is obtained by regarding part of the plurality of undetermined coefficients as functions of the remaining undetermined coefficients as variables.

20. The non-transitory computer-readable storage medium of claim 12, wherein the optimization objective function is as follows: $J=(\Phi(t_i)-t_i/T)^2$, where T is a cycle of a linear inverted pendulum model of the robot, $t_i$ is an i-th moment in the cycle, $\Phi(t_i)$ is a value of the first phase variable corresponding $t_i$, and J is the optimization objective function.

* * * * *